United States Patent [19]

Yamaguchi et al.

[11] Patent Number: 4,783,521

[45] Date of Patent: Nov. 8, 1988

[54] LINEAR SALICYLIC ACID COPOLYMERS AND THEIR METAL SALTS, PRODUCTION PROCESS THEREOF, COLOR-DEVELOPING AGENTS COMPRISING METAL-RESINS OF THE COPOLYMERS

[75] Inventors: Akihiro Yamaguchi, Kamakura; Keizaburo Yamaguchi, Kawasaki; Yoshimitsu Tanabe; Makoto Asano, both of Yokohama; Masaru Wada, Oomuta, all of Japan

[73] Assignee: Mitsui Toatsu Chemicals, Incorporated, Tokyo, Japan

[21] Appl. No.: 4,323

[22] Filed: Jan. 16, 1987

[30] Foreign Application Priority Data

| Jan. 17, 1986 | [JP] | Japan | 61-6482 |
| Jan. 31, 1986 | [JP] | Japan | 61-18027 |
| Feb. 3, 1986 | [JP] | Japan | 61-20250 |
| Feb. 3, 1986 | [JP] | Japan | 61-20251 |
| Feb. 3, 1986 | [JP] | Japan | 61-20252 |
| Dec. 23, 1986 | [JP] | Japan | 61-305332 |
| Dec. 24, 1986 | [JP] | Japan | 61-306207 |
| Dec. 25, 1986 | [JP] | Japan | 61-308026 |

[51] Int. Cl.[4] .................................. C08G 63/06
[52] U.S. Cl. .................................. 528/206; 503/216; 525/534; 528/86; 528/396; 528/425
[58] Field of Search .............. 528/206, 396, 425, 86; 525/534

[56] References Cited

U.S. PATENT DOCUMENTS

| 2,712,507 | 7/1955 | Green | 117/36 |
| 4,397,897 | 4/1983 | Asano et al. | 525/506 |
| 4,400,492 | 8/1983 | Asano et al. | 525/506 |
| 4,704,379 | 11/1987 | Shioi et al. | 503/211 |

FOREIGN PATENT DOCUMENTS

| 9309 | 5/1965 | Japan . |
| 20144 | 10/1967 | Japan . |
| 15111 | 5/1972 | Japan . |
| 10856 | 3/1974 | Japan . |
| 1327 | 1/1977 | Japan . |

Primary Examiner—Harold D. Anderson

Attorney, Agent, or Firm—Fisher, Christen & Sabol

[57] ABSTRACT

Disclosed herein are novel linear copolymers having weight average molecular weight of 500–30,000 and comprising structural units represented by the following formulae (I), (II), (III) and (IV):

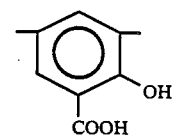

(I)

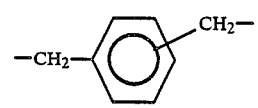

(II)

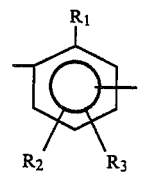

(III)

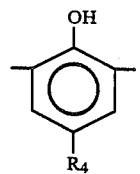

(IV)

wherein $R_1$, $R_2$ and $R_3$ mean individually an alkyl group having 4 or fewer carbon atoms and $R_4$ denotes an alkyl, cycloalkyl, aralkyl or phenyl group, and multivalent metal salts thereof in each of which the multivalent metal forms the multivalent metal salt between carboxyl groups within the same molecule of the copolymer or between different molecules of the copolymer; color-developing agents comprising multivalent metal-modified resins of the copolymers; and color-developing sheets obtained by coating the color-developing agents on their surfaces.

22 Claims, 2 Drawing Sheets

LINEAR SALICYLIC ACID COPOLYMERS AND THEIR METAL SALTS, PRODUCTION PROCESS THEREOF, COLOR-DEVELOPING AGENTS COMPRISING METAL-RESINS OF THE COPOLYMERS

BACKGROUND OF THE INVENTION (1) Field of the Invention

This invention relates to novel salicylic acid resins and multivalent metal salts thereof, color-developing agents containing the multivalent metal-modified resins as effective components and suited for pressure-sensitive copying paper, as well as color-developing sheets making use of the color-developing agents and suited for use in pressure-sensitive copying paper.

(2) Description of the Prior Art

Pressure-sensitive copying paper sheets are also called carbonless copying paper sheets. They produce a color by mechanical or impactive pressure, for example, by writing strokes or typewriter impression, thereby allowing to make a plurality of copies at the same time. Among such pressure-sensitive copying paper sheets, there are those called "transfer type copying paper sheets", those called "self-contained copying paper sheets", etc. Their color-producing mechanisms are each based on a color-producing reaction between an electron-donating colorless dyestuff precursor and an electron-attracting color-developing agent. Taking a pressure-sensitive copying paper sheet of the transfer type by way of example, it will be described with reference to FIG. 1 which is a schematic cross-sectional view showing the structure of the exemplary pressure-sensitive copying paper sheet.

Figure 1:
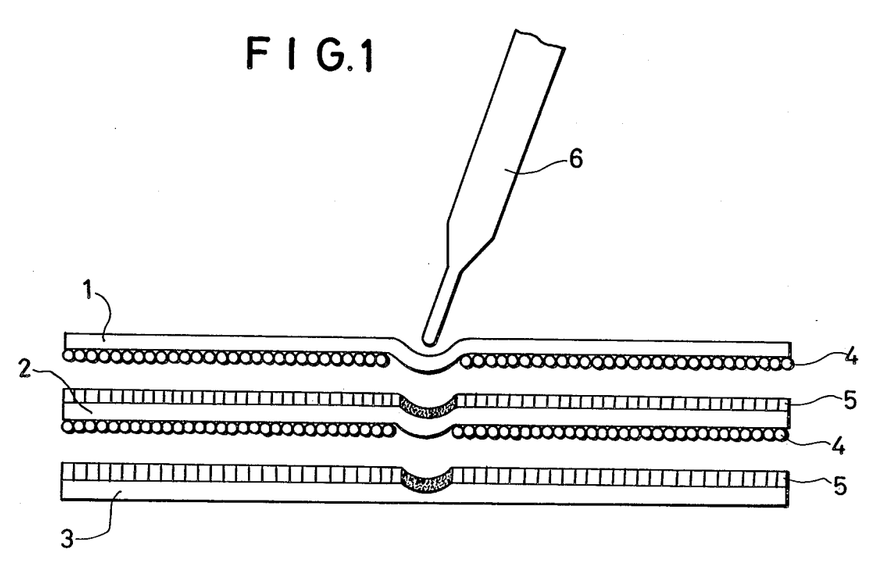
FIG. 1 is a schematic cross-sectional view showing the structure of a pressure sensitive paper sheet.

The back sides of a CB-sheet 1 and CF/CB-sheet 2 are coated with microcapsules 4 which have diameters of several micrometers to somewhat greater than 10 micrometers and have been obtained by dissolving a colorless pressure-sensitive dyestuff precursor in a non-volatile oil and then encapsulating the resultant solution with high-molecular films such as gelatin films. On the other hand, the front sides of the CF/CB-sheets 2 and a CF-sheet 3 are coated with a coating formulation containing a color-developing agent 5 which has such properties that upon contact with the pressure-sensitive dyestuff precursor, the color-developing agent 5 undergoes a reaction with the dyestuff precursor, thereby causing the dyestuff precursor to produce its color. In order to make copies, they are stacked in the order of the CB-sheet, (CF/CB-sheet), (CF/CB-sheet) and CF-sheet with the sides coated with the dyestuff precursor maintained in contiguous relation with the sides coated with the color-developing agent. The CF/CB-sheets are optional. When a pressure is applied locally by a ball-point pen 6 or a typewriter, the capsules 4 are ruptured there. As a result, the solution containing the pressure-sensitive dyestuff precursor is transferred to the color-developing agent 5 so that one or more copied records are obtained.

As electron-attracting color-developing agents, there have been proposed (1) inorganic solid acids such as acid clay and attapulgite, as disclosed in U.S. Pat. No. 2,712,507; (2) substituted phenols and diphenols, as disclosed in Japanese Patent Publication No. 9309/1965; (3) p-substituted phenol-form aldehyde polymers, as disclosed in Japanese Patent Publication No. 20144/1967; (4) metal salts of aromatic carboxylic acids, as disclosed in Japanese Patent Publication Nos. 10856/1974 and 1327/1977; etc. Some of them have already been employed actually.

As performance conditions which a color-developing sheet is supposed to satisfy, may be mentioned little yellowing during storage and upon exposure to radiant rays such as sunlight and good fastness of produced color marks so that they do not disappear or fade easily by radiant rays, water or a plasticizer, to say nothing of excellent color-developing ability not only right after its fabrication but also after its storage over a long period of time.

Color-developing agents, which have been proposed to date, and sheets coated with such conventional color-developing agents have both advantages and disadvantages in performance. For example, inorganic solid acids are inexpensive but adsorb gas and moisture in the air during storage. They hence result in yellowing of paper surfaces and reduced color-producing performance. Substituted phenols have insufficient color-producing ability and produced color marks have low color densities. Para-phenylphenol-novolak resins which are usually employed as p-substituted phenol-formaldehyde polymers have excellent color-producing ability, but their coated paper sheets undergo yellowing and produced color marks are faded significantly upon exposure to sunlight or during storage (especially, by nitrogen oxides in the air). In addition, metal salts of aromatic carboxylic acids are good in color-producing ability, yellowing resistance and light fastness but their resistance to water or plasticizers cannot still be considered sufficient.

SUMMARY OF THE INVENTION

The first object of this invention is to provide a novel linear copolymer which has excellent properties in flexibility, oxidation resistance, formability and moldability, etc. and can form metal chelate resins and multivalent metal salts excellent as color-developing agents for pressure-sensitive copying paper.

The second object of this invention is to provide an excellent color-developing agent for pressure-sensitive copying paper, which is a metal-modified product composed of a multivalent metal salt of the above copolymer or a molten mixture containing a multivalent metal salt of the above copolymer.

The third object of this invention is to provide an excellent color-developing sheet which makes use of the above color-developing agent and is suitable for pressure-sensitive copying paper.

The present inventors have carried out an extensive investigation with a view toward attaining the above-described various objects. As a result, the present has now been completed.

The present invention therefore provides a linear copolymer comprising 5–60 mole % of a structural unit (I), 30–50 mole % of a structural unit (II), 0–60 mole % of a structural unit (III) and 0–60 mole % of a structural unit (IV) and having a weight average molecular weight of 500–30,000, said structural unit (I), (III) or (IV) being coupled with different one of the structural unit (I), (III) or (IV) via the structural unit (II), and said structural units (I), (II), (III), and (IV) being represented respectively by the following formulae (I), (II), (III) a d (IV):

wherein $R_1$, $R_2$ and $R_3$ mean individually an alkyl group having 4 or fewer cabron atoms and $R_4$ denotes an alkyl, cycloalkyl, aralkyl or phenyl group, or a multivalent metal salt thereof in which the multivalent metal forms the multivalent metal salt between carboxyl groups within the same molecule of the copolymer or between different molecules of the copolymer; a color-developing agent which contains as an effective component a multivalent metal-modified resin composed of either one of the above-described multivalent metal salt and a molten mixture containing the multivalent metal salt and is suitable for pressure-sensitive copying paper; and a color-developing sheet with the above color-developing agent distributed almost evenly at least on one side thereof, said color-developing sheet being suitable for use in pressure-sensitive copying paper.

The copolymers and multivalent metal salts thereof are novel high-molecular compounds and their salts, which have not been produced to date. Accordingly, the color-developing agents of this invention are also novel color-developing agents.

Compared with color-developing sheets making use of an inorganic solid acid or p-phenylphenol novolak resin, color-developing sheets making use of the novel color-developing agents of this invention have equal or better color-developing ability and produced color marks such fastness that they are not readily faded by water, plasticizers or light.

The present invention has another advantage that the yellowing problem upon exposure to sunlight has been improved, especially, the resistance to the yellowing by nitrogen oxides in the air has been improved significantly and color-developing sheets extremely advantageous for handling and storage can be provided at a low price.

BRIEF DESCRIPTION OF THE ACCOMPANYING DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENTS

The salicylic acid resins (copolymers) useful in the practice of this invention are novel resins which have not been produced to date.

The $\alpha$, $\alpha'$-dialkoxyxylenes which are essential raw materials for the production of the metal-modified resins of the co-condensation resins, said metal-modified resins being useful as color-developing agents in this invention, provide phenol resins by their reactions with corresponding phenol compounds. The phenol resins are reacted further with basic compounds such as hexamethylenetetramine so as to harden same. Namely, the phenol resins are used as so-called heat-hardening polymer compositions (Japanese Patent Publication No. 15111/1972).

However, these heat-hardening polymer compositions use phenolic acid, alkylphenols, phenylphenols, para-aminophenol, pyrogallol or fluoroglycinol. Those reacted with salicylic acid have not been known at all. No study seems to have been conducted yet in this respect, because it is readily expected that when a phenol compound and an $\alpha,\alpha'$-dialkoxyxylene are reacted in the presence of an acid catalyst, an alcohol is formed by a dealcoholizing reaction but in the case of a phenol compound containing an organic carboxylic group, namely, salicylic acid as one component of this invention, salicylic acid esters and a mixture of their resins are formed by the reaction of salicylic acid with the alcohol formed in the presence of the acid catalyst, thereby facing difficulties in obtaining the intended product.

The present inventors have however surprisingly found that when salicylic acid, an $\alpha,\alpha'$-dialkoxyxylene and if desired, a trialkylbenzene and/or a p-substituted phenol are reacted at a reaction temperature above 110° C. in the presence of an acid catalyst, side reactions like the corresponding esterification reaction do not take place substantially and a salicylic resin useful in the practice of the present invention can be obtained.

When reacted at a temperature above 110° C. in the present invention, the reaction proceeds fast, no esterification reaction occurs and a good resin can be obtained with ease if the carbon number of each alkyl group in the $\alpha,\alpha'$-dialkoxyxylene is 4 or smaller. Among alkyl groups having 4 carbon atoms, i.e., butyl groups, tert-butyl group tends to lead to a slow reaction.

As preferable $\alpha,\alpha'$-dialkoxyxylenes capable of affording co-condensation resins useful in the practice of this invention, may be mentioned $\alpha,\alpha'$-dimethoxy-o-xylene, $\alpha,\alpha'$-dimethoxy-m-xylene, $\alpha,\alpha'$-dimethoxy-p-xylene, $\alpha,\alpha'$-diethoxy-o-xylene, $\alpha,\alpha'$-diethoxy-m-xylene, $\alpha,\alpha'$-diethoxy-p-xylene, $\alpha,\alpha'$-di-n-propoxy-o-xylene, $\alpha,\alpha'$-di-n-propoxy-m-xylene, $\alpha,\alpha'$-di-n-propoxy-p-xylene, $\alpha,\alpha'$-diisopropoxy-o-xylene, $\alpha,\alpha'$-diisopropoxy-m-xylene, α,α'-diisopropoxy-p-xylene, α,α'-di-n-butoxy-o-xylene, α,α'-di-n-butoxy-m-xylene, α,α'-di-n-butoxy-p-xylene, α,α'-di-sec-butoxy-o-xylene, α,α'-di-sec-butoxy-m-xylene, α,α'-di-sec-butoxy-p-xylene, α,α'-diisobutoxy-o-xylene, α,α'-diisobutoxy-m-xylene, α,α'-diisobutoxy-p-xylene. The present invention is however not necessarily limited to such exemplary α,α'-dialkoxyxylenes.

In the trialkylbenzene useful in the practice of this invention to provide a co-condensation resin, the three alkyl groups are individually an alkyl group having 4 or fewer carbon atoms. The trialkylbenzenes preferable for use in the present invention include 1,2,3-trimethylbenzene, 1,3,5-trimethylbenzene, 1,2,4-trimethylbenzene, 2,3-dimethylethylbenzene, 2,6-dimethylethylbenzene, 3,4-dimethylethylbenzene, 3,5-dimethylethylbenzene, 2,5-dimethylethylbenzene, 2,4-dimethylethylbenzene, 1,2,3-triethylbenzene, 1,2,4-triethylbenzene, 1,3,5-triethylbenzene, 2,3-dimethylisopropylbenzene, 2,3-diethylisopropylbenzene, 2,3-dimethyl-n-propylbenzene, 3,5-dimethyl-n-propylbenzene, 3,5-dimethylisopropylbenzene, 2,6-dimethylisopropylbenzene, 2,6-diethylisopropylbenzene, 3,5-diethylisopropylbenzene, 3,4-dimethylisopropylbenzene, 3,4-diethyl-n-propylbenzene, 2,5-dimethylisopropylbenzene, 2,5-diethylisopropylbenzene, 2,4-dimethyl-isopropylbenzene, 2,4-disthylisopropylbenzene, 3,5-dimethylisopropylbenzene, 3,5-diisopropyltoluene, 1,2,3-triisopropylbenzene, 1,2,4-triisopropylbenzene, 1,3,5-triisopropylbenzene, 1,2,4-tri-n-propylbenzene, 1,3,5-tri-n-propylbenzene, 2,3-dimethyl-n-butylbenzene, 3,4-dimethylisobutylbenzene, 3,4-diethyl-n-butylbenzene, 2,3-di-n-butyltoluene, 3,5-di-n-butyltoluene, 1,2,4-tri-n-butylbenzene, 1,3,5-tri-n-butylbenzene, 2-ethyl-4-n-butyltoluene, 2-ethyl-3-isopropyltoluene, etc. The present invention is however not necessarily limited to such illustrative trialkylbenzenes. Among the butyl groups having 4 carbon atoms, tert-butyl group has tendency hard to react in co-condensation. Tert-butyl group is hence not desirable.

Among these trialkylbenzenes, 1,3,5-trimethylbenzene has been known to be bifunctional [Kogyo Kagaku Zasshi, 65(4), 626-629 (1962)]. The other trialkylbenzenes are also believed to be bifunctional.

The alkyl groups are oriented to the ortho- and para-positions in a condensation reaction of a trialkylbenzene and the alkyl groups are hyperconjugated. In the case of 1,2,4-trialkylbenzenes for example, the 3- and 5-positions are believed to take part in condensation reactions. The 4- and 6-positions are however believed to take part in condensation reactions in the case of 1,2,3-trialkylbenzenes.

Exemplary p-substituted phenol useful in the practice of this invention to provide co-condensation resins include para-alkylphenols in each of which the alkyl group has 1-12 carbon atoms, para-cycloalkylphenols, para-aralkylphenols, and para-phenylphenols. As para-alkylphenols, may be mentioned para-cresol, para-ethylphenol, para-isopropylphenol, para-sec-butylphenol, para-tert-butylphenol, para-tert-octylphenol, para-nonylphenol, etc. As para-cycloalkylphenols, may be mentioned para-cyclopentylphenol and para-cyclohexylphenol. Para-benzylphenol, para-α-methylbenzylphenol, para-α,α-dimethylbenzylphenol and the like may be mentioned as para-aralkylphenols.

These p-substituted phenols may be used either singly or in combination.

The p-substituted phenols take part at the positions ortho to their hydroxyl groups in condensation reactions.

Upon production of a salicylic acid resin by the condensation of salicylic acid and an α,α'-dialkoxyxylene or the co-condensation of salicylic acid, an α,α'-dialkoxyxylene, a trialkylbenzene and/or a p-substituted phenol, the individual raw materials may be used in the following proportions.

The α,α'-dialkoxyxylene may be used in an amount of 0.1–1.0 mole, preferably, 0.3–0.8 mole per mole of salicylic acid, or per mole of the sum of salicylic acid, the trialkylbenzene and/or the p-substituted phenol where they are used in combination.

The trialkylbenzene may be used in an amount of 0.1–20 moles, preferably, 0.5–10 moles per mole of the salicylic acid, although the use of the trialkylbenzene is optional.

Where the p-substituted phenol is used, it may be used in an amount of 0.1-15 moles, preferably, 0.5-10 moles per mole of salicylic acid.

Figure 2:
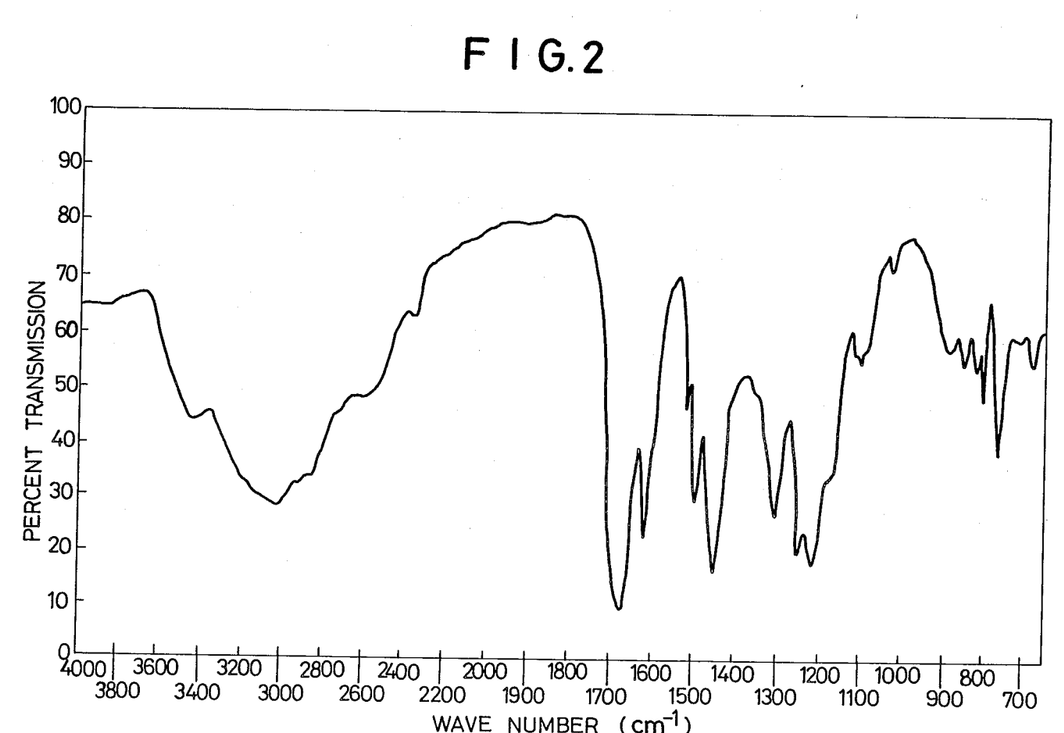
FIG. 2 is an IR spectrum of a salicylic acid resin synthesized in Resin Synthesis Example 1.

It is the purpose of the use of a p-substituted phenol or a trialkylbenzene led by mesitylene in combination with salicylic acid and its condensation with an α,α'-dialkoxyxylene to improve the miscibility of the non-volatile oil in the microcapsules coated on the back side of the CF-sheet 1 and CF/CB-sheet 2 shown in FIG. 2 with the color-developing agent, i.e., the multivalent metal-modified salicylic resin coated on the front sides of the CF/CB-sheet 2 and CF-sheet 3 also shown in FIG. 2 upon application of a pressure thereto. Since the color-developing agent composed of the multivalent metal-modified resin of the copolymer formed of such 3-4 structural units reacts rapidly with the colorless dyestuff precursor dissolved in the non-volatile oil upon application of a pressure, a merit has been brought about that sharp marks are formed instantaneously upon application of the pressure.

Upon production of the salicylic acid resin of this invention, the reaction temperature must be above 110° C. Any temperatures lower than 110° C. lead to extremely slow reaction velocities and more over greater possibility of side reactions such as esterification reactions. A temperature range of about 130°–240° C. is desired for shortening the reaction time as much as possible. The reaction time may range from 1 hour to 20 hours. As an acid catalyst, an inorganic or organic acid, especially, a mineral acid, for example hydrochloric, phosphoric or sulfuric acid, or formic acid may be used. Alternatively, a Friedel-Crafts catalyst such as zinc chloride, stannic chloride or ferric chloride or an organic sulfonic acid such as methanesulfonic acid or p-toluenesulfonic acid may be used either singly or in combination. Such a catalyst may be used in an amount of about 0.01–5 wt. % of the total weight of salicylic acid and the α,α'-dialkoxyxylene and the optional trialkylbenzene and/or p-substituted phenol.

As a general process for producing the resin useful in the practice of this invention, the raw materials such as salicylic acid and catalyst in desired amounts are added at once and are then heated to conduct their reaction at a predetermined temperature. An alcohol, which is formed as the reaction proceeds, is trapped out of the reaction system. The alcohol, which still remains in a small amount in the reaction system, is taken out of the reaction system by nitrogen gas if necessary.

After completion of the reaction, the contents are taken out of the reactor. Subsequent to its cooling, they are subjected to grinding or the like to provide the intended resin. If unreacted salicylic acid remains in the resin, it may be removed by washing the resin with warm water or by washing the resin with an organic solvent such as benzene, toluene, xylene, monochlorobenzene, methyl isobutyl ketone or cyclohexanone and then washing same with warm water.

The weight average molecular weight ($\overline{Mw}$) of the resin of this invention is within a range of 500–30,000, preferably, 500–10,000.

The proportions of the respective structural units, i.e., salicylic acid, dialkoxyxylene, trialkylbenzene and p-substituted phenol moieties in the resin are 5–60 mole %, 30–50 mole %, 0–60 mole % and 0–60 mole % respectively.

A resin formed from salicylic acid and an α,α'-dialkoxy-p-xylene as raw materials is represented by the following general formula (V):

wherein $R_4$ means an alkyl, cycloalkyl, aralkyl or phenyl group, together with the above-described structural unit (VI) and in some instances, the structural unit (VII) and having a weight average molecular weight of 500–30,000.

wherein n means the polymerization degree and stands for an integer of 0–100. The —CH$_2$-substituted position of each of both terminal salicylic acid residual groups is ether one of the positions meta to the carboxyl group.

A salicylic acid resin formed from salicylic acid, an α,α'-dialkoxyxylene and a trialkylbenzene as raw materials is a co-condensation resin containing structural units represented by the following general formulae (VI) and (VII):

wherein $R_1$, $R_2$ and $R_3$ mean individually an alkyl group having 4 or fewer carbon atoms, and having a weight average molecular weight of 500–30,000. The proportions of the structural units (VI) and (VII) vary depending on the amounts of salicylic acid and the trialkylbenzene employed, etc.

When a p-substituted phenol is used, the resulting resin is a co-condensation resin containing a structural unit represented by the following general formula (VIII):

As described above, the salicylic acid resin of this invention is composed of the bifunctional structural units and linear. It is not considered to take any network structure.

As understood from the foregoing description, the term "multivalent metal-modified salicylic acid resin" as used herein means either the multivalent metal salt of the above salicylic acid resin or a molten mixture containing the multivalent metal salt.

Several known processes can be applied for the production of the multivalent metal salts from the co-condensation resins of salicylic acid. They may be produced, for example, by reacting alkali metal salts of the co-condensation resins with water-soluble multivalent metal salts in water or in a solvent which can dissolve both reactants.

Namely, a multivalent metal salt of the copolymer can be obtained as a precipitate by dispersing the copolymer in an aqueous solution, alcohol solution or water-alcohol solution which contains the hydroxide or carbonate or an alkoxide of an alkali metal in an amount at least equivalent to the carboxyl groups in the copolymer, dissolving the copolymer at 0°–100° C., and then adding and reacting at 0°–100° C. a water-soluble multivalent metal salt either as is or in the form of an aqueous solution, alcohol solution or water-alcohol solution to the solution of the copolymer. It is desirable to react the water-soluble multivalent metal salt in an amount of about 0.5–1 gram equivalent based on the carboxyl groups in the copolymer.

A molten mixture containing a multivalent metal salt of a salicylic acid resin can be produced by mixing the resin with a multivalent metal salt of an organic carboxylic acid such as formic acid, acetic acid, propionic acid, valeric acid, caproic acid, stearic acid or benzoic acid, heating and reacting the resultant mixture and then cooling same. In some instances, a basic material, for example, ammonium carbonate, ammonium bicarbonate, ammonium acetate or ammonium benzoate may be added further. Here again, the resulting mixture is then heated, molten and reacted. It is also possible to use the resin together with the carbonate, oxide or hydroxide of a multivalent metal. They are heated and molten together with a basic material, e.g., an organic ammonium carboxylate such as ammonium formate, ammonium acetate, ammonium caproate, ammonium stearate or ammonium benzoate, whereby they are reacted together. The reaction mixture is thereafter cooled to provide a molten mixture.

When a metal-modified resin is produced by heating and melting the metal and resin, they are usually molten at 100°–180° C. The reaction temperature may generally range from 1 to several hours, although it depends on resin composition, melting temperature and the amount and kind of multivalent metal salt. Regarding the amount of the multivalent metal salt to be used, it is desirable to use an organic carboxylate, carbonate, oxide or hydroxide of a the multivalent metal in such an amount that the metal content is 1 wt. %–about 20 wt. % of the whole weight of the resin.

No particular limitation is imposed on the amount of a basic material to be used. It is generally employed in an amount of 1–15 wt. % based on the whole weight of the resin. When a basic material is used, it is more preferable to use it after mixing it with the multivalent metal salt in advance.

Exemplary metals in multivalent metal-modified salicylic acid resins useful in the present invention include metals other than alkali metals such as lithium, sodium and potassium. The preferable multivalent metals include magnesium, aluminum, copper, calcium, zinc, tin, barium, cobalt and nickel. Of these, zinc is particularly effective. Each of these multivalent metals forms a multivalent metal salt with carboxyl groups in the same molecule or different molecules of the salicylic acid resin.

The color-developing agent of this invention may be used in combination with one or more of known color-developing agents, namely, inorganic solid acids such as activated clay, organic polymers such as phenolformaldehyde resin and metal salts of aromatic carboxylic acids without any problems or inconvenience.

The color-developing agent of this invention may also be used in combination with at least one of the oxide, hydroxide and carbonate of a multivalent metal selected from the group consisting of zinc, magnesium, aluminum, lead, titanium, calcium, cobalt, nickel, manganese and barium.

As a method for the fabrication of the color-developing sheet of this invention suitable for use in pressure-sensitive copying paper, any one of the following methods can be employed: (1) to apply a water-base coating formulation, which makes use of an aqueous suspension of the color-developing agent, to a base material such as paper web; (2) to incorporate the color-developing agent in a base paper web when the base paper web is produced; and (3) to coat a base material with a solution or suspension of the color-developing agent in an organic solvent.

Upon preparation of a coating formulation, kaolin clay or its analogous clay, calcium carbonate, starch, synthetic or natural latex, etc are added to obtain the coating formulation with suitable viscosity and coating applicability. The proportion of the color-developing agent in the coating formulation is preferably 10–70% of the whole solids. If the proportion of the color-developing agent is smaller than 10%, it is impossible to exhibit sufficient color-producing ability. Any proportions greater than 70% result in color-developing sheets having poor paper surface characteristics. The coating formulation is applied at a rate of 0.5 g/m² or more, preferably, 1–10 g/m² in terms of dry weight.

In the color-developing sheet of this invention which is suitable for pressure-sensitive copying paper, it is possible to use the color-developing agent and coating formulation in smaller amounts. In addition, the concentration, viscosity, etc. of the coating formulation can be varied over relatively wide ranges. Both on-machine and off-machine coating operations are hence feasible. A great merit has hence be brought about not only from the viewpoint of performance but also from the standpoint of fabrication steps for pressure-sensitive copying paper.

By the present invention, there have been provided the novel salicylic acid resins and their multivalent metal salts, color-developing agents composed of multivalent metal-modified resins of the salicylic acid resins and suited for pressure-sensitive copying paper as well as color-developing sheets containing the color-developing agents and suited for pressure-sensitive copying paper.

The color-developing sheets of this invention are substantially free from yellowing by light and gases in the air such as nitrogen oxides. Produced color marks are stable to light, plasticizers and the like and are not substantially lowered in color density. They have good waterproofness. The present invention is therefore possible to broaden the utility of pressure-sensitive copying paper to such fields that conventional color-developing sheets are not suited owing to the requirement for long-term storage stability. Accordingly, this invention has extremely great practical significance.

The present invention will hereinafter be described in further detail by the following Examples.

The following methods were relied upon for the determinatoon of performance of color-developing sheets for pressure-sensitive copying paper.

1. Color-producing speed and produced color density (conducted in an air-conditioned room of 20° C. and 65% R.H.):

Using (1) a commercial blue-color producing CB-sheet containing Crystal Violet Lactone (CVL) as a principal pressure-sensitive dyestuff precursor ("NW-40T", trade name; product of Jujo Paper Co., Ltd.) and (2) a commercial black-color producing CB-sheet containing 3-diethylamino-6-methyl-7-phenyl-aminofluoran (ODB) as a principal pressure-sensitive dyestuff precursor ("KW-40T", trade name; product of Jujo Paper Co., Ltd.) separately, a sample color-developing sheet (CF-sheet) coated with a water-base coating formulation was stacked with their coated sides maintained in contiguous relation. The thus-stacked pressure-sensitive copying paper was typed by a typewriter to produce a color.

The reflectance of the sample color-developing sheet was measured by a "Σ80 Color Difference Meter" (trade name; manufactured by Tokyo Denshoku Kogyo K.K. The same color difference meter was also used in the subsequent measuring tests.) twice, namely, 1 minute and 30 seconds after the typing and 24 hours after the typing. The results are expressed in terms of Y value.

Y value is a value obtained in accordance with the double-field display method established by CIE (Commision Internationale de l'Eclairage). It is expressed by the following equation (the same definition also applies to Y values in the subsequent measuring tests):

$$Y = k \int_{380}^{780} P(\lambda)\bar{y}(\lambda)\tau(\lambda)d\lambda$$

$$k = 100 / \int_{380}^{780} P(\lambda)\bar{y}(\lambda)d\lambda$$

where

P(λ): distribution of standard light source.

$\bar{y}$(λ): color matching function in the double field.

τ(λ): spectral characteristics of each sample.

Regarding P(λ) and y(λ), reference may be had to JIS Z8722.

2. Light fastness of produced color marks:

Each sample color-developing sheet, which had produced a color in the manner described above in the testing method 1, was exposed for 2 hours (and for 4 hours) to light on a carbon arc fade meter (manufactured by Suga Testing Machine Co., Ltd.). After the exposure, its reflectance was measured by the "Σ-80 Color Difference Meter". The results are expressed in terms of Y-value.

The smaller the Y value and the smaller its difference from the Y value before the test, the less the fading by the light and the more preferable.

3. Plasticizer resistance:

DOP microcapsule coated paper sheets were prepared by forming microcapsules, which contained dioctyl phthalate (DOP) as a core substance, had an average capsule size of 5.0 μm, and were equipped with melamine-formaldehyde resin capsule walls, adding a small amount of a starch-type binder, applying the thus-prepared coating formulation by an air-knife coater on a high-quality paper web to achieve a dry coat weight of 5 g/m² and then drying the thus-coated paper web. One of the DOP microcapsule coated paper sheets and the color-developing sheet with color marks produced above in the testing method 1 were brought into contiguous relation with their coated sides facing each other. They were thereafter caused to pass under a linear pressure of 100 Kg/cm through a super calender roll, so that DOP was allowed to penetrate uniformly into the colored surface.

One hour after the test, the reflectance of the color-developing sheet was measured by the "Σ-80 Color Difference Meter". The results are expressed in terms of Y value. The smaller the Y value and the smaller its difference from the Y value before the test, the better the plasticizer resistance of the produced color marks.

4. Waterproofness of produced color marks:

Each sample color-developing sheet, which had been colored by the testing method 1, was dipped for 2 hours in water. Density changes of the produced color marks were observed visually.

5. Yellowing property of color-developing sheets:

(5-1) Yellowing by $NO_x$:

Following JIS L-1055 (Testing Method for $NO_x$ Gas Fastness of Dyed Materials and Dyes), each sample color-developing sheet was stored for 1 hour in a closed vessel of an atmosphere of $NO_x$ occurred by the reaction of $NaNO_2$ (sodium sulfite) and $H_3PO_4$ (phosphoric acid). The degree of its yellowing was investigated.

Upon an elapsed time of 1 hour after completion of the test, the reflectance of the color-developing sheet was measured by the "Σ-80 Color Difference Meter". The measurement results are expressed in terms of WB value. The greater the WB value and the smaller its difference from the WB value before the test, the smaller the yellowing property in an $NO_x$ atmosphere.

(5-2) Yellowing by light:

Each sample color-developing sheet was exposed for 4 hours to light on the carbon arc fade meter (manufactured by Suga Testing Machine Co., Ltd.). After the test, the reflectance of the sample color-developing sheet was measured by the "Σ-80 Color Difference Meter". The measurement results are expressed in terms of WB value. The greater the WB value and the smaller its difference from the WB value before the test, the smaller the yellowing property upon exposure to light.

Various salicylic acid resins and their metal-modified resins of this invention were produced respectively in Resin Synthesis Examples 1–42 and Metal-Modified Resin Synthesis Examples 1–50, which will follow:

RESIN SYNTHESIS EXAMPLE 1

In a glass-made reactor, 27.6 g (0.2 mole) of salicylic acid, 23.2 g (0.14 mole) of α,α'-dimethoxy-p-salicylic xylene and 0.1 g of p-toluenesulfonic acid as a catalyst were charged and were then subjected to condensation for 3 hours at 170°–180° C. In the course of the condensation, 8 g of methanol was distilled out in total. At the same temperature, the reaction mixture was immediately poured in an enameled shallow tray, in which the reaction mixture was left over. The resinous reaction product was thus solidified, thereby obtaining 40 g of a reddish brown and transparent resin. The weight average molecular weight of the thus-obtained resin was 5,200. Its softening point was measured by a ring and ball softening point measuring apparatus in accordance with JIS K-2548. It was found to be 140° C.

The results of its IR analysis (measured in the form of a KBr tablet) are shown in FIG. 2.

RESIN SYNTHESIS EXAMPLE 2

In a glass-made reactor, 27.6 g (0.2 mole) of salicylic acid, 10 g (0.06 mole) of α,α'-diethoxy-p-xylene and 0.75 g of anhydrous zinc chloride as a catalyst were charged and were then subjected to condensation for 4 hours at 160°–170° C. The internal temperature was then cooled to 100° C., followed by an addition of 70 ml of methyl isobutyl ketone to prepare a solution. Thereafter, 500 ml of warm water was added to the solution and the resultant mixture was stirred at 95°–100° C. for 20 minutes. The water layer was removed. This washing with warm water and separation of the resulting water layer were repeated two more times so as to remove unreacted salicylic acid. The solvent was the distilled out and the condensate was cooled to obtain 18.4 g of a reddish brown and transparent resin. The weight average molecular weight of the thus-obtained resin was 820, while its softening point was 84° C.

RESIN SYNTHESIS EXAMPLES 3–5

Salicylic acid resins were obtained in the same manner as in Resin Synthesis Example 1 except that the kind of the α,α'-dialkoxy-p-xylene, its molar ratio to salicylic acid, the kind and amount of the catalyst used and the conditions for the condensation reaction were modified respectively as shown in Table 1.

TABLE 1

| Resin synthesis example | α,α'-Dialkoxy-p-xylene Kind | Amount used* | Catalyst Kind | Amount used** | Reactions conditions (°C./hr) | Softening point (°C.) | Weight average molecular wt., $\overline{M}w$ |
|---|---|---|---|---|---|---|---|
| 3 | α,α'-di-n-butoxy-p-xylene | 0.6 | stannic chloride | 1.0 | 180–190/8 | 116 | 2900 |
| 4 | α,α'-diisopropoxy-p-xylene | 0.8 | methanesulfonic acid | 0.3 | 140–195/3 | 175 and up | 9500 |
| 5 | α,α'-dimethoxy-p-xylene | 0.55 | sulfuric acid | 0.1 | 120–130/6 | 98 | 2300 |

*(in molar ratio to salicylic acid)
**(wt. % based on the whole reaction mixture)

RESIN SYNTHESIS EXAMPLE 6

Charged in a reactor were 13.8 g (0.1 mole) of salicylic acid, 36.1 g (0.3 mole) of mesitylene and 33.2 g (0.2 mole) of α,α'-dimethoxy-p-xylene, followed by further addition of 0.2 g of p-toluenesulfonic acid and 0.2 g of anhydrous zinc chloride as catalysts. Thereafter, the contents were heated with stirring and reacted at 150°–160° C. for 4 hours. In the course of the reaction, 13.3 g of methanol was distilled out in total. After completion of the reaction, 200 ml of toluene was added to dissolve the reaction mixture. The solution was then added with 400 ml of warm water. After stirring the resultant mixture for 30 minutes under reflux, the lower layer, i.e, the water layer was removed. The extraction and separation of unreacted monomers with 400 ml of warm water was repeated two more times, followed by distillation of the solvent, i.e., toluene under reduced pressure. The molten resin was thereafter taken out and cooled to obtain a reddish brown and transparent resin. The weight average molecular weight of the thus-obtained resin was 2,400. Its softening point was measured by the ring and ball softening point measuring apparatus in accordance with JIS K-2548. It was found to be 83° C. A tetrahydrofuran solution of the resin was titrated with a 1/10N aqueous solution of sodium carbonate to determine the content of the salicylic acid moiety in the resin. It was found to be 14.3 wt. %.

RESIN SYNTHESIS EXAMPLES 7–29

The various salicylic acid-trialkylbenzene co-condensation resins shown in Table 2-1 to Table 2-4 were obtained in the same manner as in Resin Synthesis Example 6 except that the amounts of the trialkylbenzene, α,α'-dialkoxyxylene and catalyst were modified relative to salicylic acid as shown in Table 2-1 to Table 2-4 and their kinds and the reaction conditions were also changed as shown in the same table.

TABLE 2-1

Salicylic Acid-Trialkylbenzene Co-Condensation Resins

| Resin synthesis example | Amount of salicylic acid (mole) | Amount of mesitylene (mole) | α,α'-Dialkoxyxylene Kind | Amount (mole) | Catalyst Kind | Amount (*) | Reaction conditions Temp./time (°C./hr) | Softening** point (°C.) | Weight average molecular weight $\overline{M}w$ | Proportion of salicylic acid in reaction mixture (wt. %) |
|---|---|---|---|---|---|---|---|---|---|---|
| 7 | 0.1 | 0.1 | α,α'-dimethoxy-p-xylene | 0.06 | p-toluenesulfonic acid | 0.5 | 140–170/3 | 98 | 750 | 13.8 |
| 8 | 0.1 | 0.9 | α,α'-dimethoxy-p-xylene | 0.33 | methanesulfonic acid + zinc chloride | 0.1 / 0.2 | 130–150/3 | 68 | 850 | 7.2 |
| 9 | 0.1 | 0.5 | α,α'-dimethoxy-p-xylene | 0.45 | p-toluenesulfonic acid + zinc chloride | 0.1 / 0.2 | 160–170/3 | 121 | 4800 | 10.5 |
| 10 | 0.1 | 0.3 | α,α'-diethoxy-p-xylene | 0.2 | stannic chloride | 0.2 | 160–180/4 | 81 | 1950 | 17.1 |
| 11 | 0.1 | 0.3 | α,α'-di-n-butoxy-p-xylene | 0.2 | stannic chloride | 0.5 | 170–185/6 | 77 | 2200 | 16.5 |

* wt. % based on the whole reaction mixture
** Measured by a ring and ball softening point measuring apparatus in accordance with JIS-K-2548.

TABLE 2-2

Salicylic Acid-Trialkylbenzene Co-Condensation Resins

| Resin synthesis ex. | Composition of reaction mixture ||||||| Reaction conditions Temp./time (°C./hr) | Resin ||| Proportion of salicylic acid in reaction mixture (wt. %) |
|---|---|---|---|---|---|---|---|---|---|---|---|
| | Amount of salicylic acid (mole) | 1,3,5-Trialkylbenzene || α,α′-Dialkoxyxylene || Catalyst || | Softening point ** (°C.) | Weight average molecular weight, $\overline{M}w$ | |
| | | Kind | Amount (mole) | Kind | Amount (mole) | Kind | Amount (*) | | | | |
| 12 | 0.1 | 1,3,5-triethylbenzene | 0.3 | α,α′-dimethoxy-p-xylene | 0.2 | p-toluenesulfonic acid + anhydrous zinc chloride | 0.2<br>0.2 | 150–160/4 | 88 | 2550 | 16.0 |
| 13 | 0.1 | 1,3,5-triisopropylbenzene | 0.1 | α,α′-dimethoxy p-xylene | 0.08 | p-toluenesulfonic acid | 0.5 | 160–180/5 | 110 | 1780 | 30.2 |
| 14 | 0.1 | 3,5-diethyltoluene | 0.8 | α,α′-dimethoxy-p-xylene | 0.33 | methanesulfonic acid + zinc chloride | 0.1<br>0.2 | 150–160/5 | 77 | 850 | 7.8 |
| 15 | 0.1 | 1,3,5-tri-n-butylbenzene | 0.5 | α,α′-dimethoxy-p-xylene | 0.36 | p-toluenesulfonic acid + zinc chloride | 0.1<br>0.2 | 150–160/5 | 97 | 3750 | 13.1 |
| 16 | 0.1 | 1,3,5-triethylbenzene | 0.35 | α,α′-diethoxy-p-xylene | 0.2 | stannic chloride | 0.2 | 140–160/5 | 89 | 2000 | 14.9 |
| 17 | 0.1 | 1,3,5-triethylbenzene | 0.3 | α,α′-di-n-butoxy-p-xylene | 0.2 | stannic chloride | 0.5 | 150–170/6 | 93 | 2200 | 14.2 |

* wt. % based on the whole reaction mixture
** Measured by a ring and ball softening point measuring apparatus in accordance with JIS-K-2548.

TABLE 2-3

Salicylic Acid-Trialkylbenzene Co-Condensation Resins

| Resin synthesis ex. | Composition of reaction mixture ||||||| Reaction conditions Temp./time (°C./hr) | Resin ||| Proportion of salicylic acid in reaction mixture (wt. %) |
|---|---|---|---|---|---|---|---|---|---|---|---|
| | Amount of salicylic acid (mole) | Trialkylbenzene || α,α′-Dialkoxyxylene || Catalyst || | Softening point ** (°C.) | Weight average molecular weight $\overline{M}w$ | |
| | | Kind | Amount (mole) | Kind | Amount (mole) | Kind | Amount (*) | | | | |
| 18 | 0.1 | 1,2,4-trimethylbenzene | 0.3 | α,α′-dimethoxy-p-xylene | 0.2 | p-toluenesulfonic acid + anhydrous zinc chloride | 0.24<br>0.24 | 150–160/4 | 81 | 2380 | 16.2 |
| 19 | 0.1 | 2,3,di-n-butyltoluene | 0.15 | α,α′-dimethoxy-p-xylene | 0.2 | p-toluenesulfonic acid | 0.5 | 160–180/5 | 93 | 6400 | 23.5 |
| 20 | 0.1 | 2,4-diethyltoluene | 0.8 | α,α′-dimethoxy-p-xylene | 0.33 | methanesulfonic acid + zinc chloride | 0.1<br>0.2 | 150–160/5 | 71 | 780 | 6.2 |
| 21 | 0.1 | 2,3-dimethylisopropylbenzene | 0.5 | α,α′-dimethoxy-p-xylene | 0.36 | p-toluenesulfonic acid + zinc chloride | 0.1<br>0.2 | 150–160/5 | 79 | 2900 | 11.1 |
| 22 | 0.1 | 3,4-dimethylbenzene | 0.35 | α,α′-diethoxy-p-xylene | 0.2 | stannic chloride | 0.2 | 140–160/5 | 81 | 2480 | 14.8 |
| 23 | 0.1 | 1,2,3-trimethylbenzene | 0.3 | α,α′-di-n-butoxy-p-xylene | 0.2 | stannic chloride | 0.5 | 150–160/6 | 84 | 2850 | 15.9 |

* wt. % based on the whole reaction mixture
** Measured by a ring and ball softening point measuring apparatus in accordance with JIS-K-2548.

TABLE 2-4

Salicylic Acid-Trialkylbenzene Co-Condensation Resins

| Resin synthesis ex. | Composition of reaction mixture | | | | | | | | Reaction conditions Temp./time (°C./hr) | Resin | | Proportion of salicylic acid in reaction mixture (wt. %) |
|---|---|---|---|---|---|---|---|---|---|---|---|---|
| | Amount of salicylic acid (mole) | Trialkylbenzene | | α,α'-Dialkoxyxylene | | Catalyst | | | | Softening point ** (°C.) | Weight average molecular weight Mw | |
| | | Kind | Amount (mole) | Kind | Amount (mole) | Kind | | Amount (*) | | | | |
| 24 | 0.1 | 1,2,4-trimethylbenzene | 0.3 | α,α'-dimethoxy-o-xylene | 0.2 | p-toluenesulfonic acid + anhydrous zinc chloride | | 0.2 0.2 | 150–160/4 | 81 | 2250 | 14.0 |
| 25 | 0.1 | 2,3-di-n-butyltoluene | 0.2 | α,α'-dimethoxy-m-xylene | 0.2 | p-toluenesulfonic acid | | 0.5 | 160–180/5 | 90 | 4900 | 21.3 |
| 26 | 0.1 | 2,4-diethyltoluene | 0.8 | α,α'-dimethoxy-m-xylene | 0.33 | methanesulfonic acid + zinc chloride | | 0.1 0.2 | 150–160/5 | 79 | 950 | 7.5 |
| 27 | 0.1 | 2,5-dimethylisopropylbenzene | 0.5 | α,α'-dimethoxy-m-xylene | 0.36 | p-toluenesulfonic acid + zinc chloride | | 0.1 0.2 | 150–160/5 | 85 | 3100 | 13.1 |
| 28 | 0.1 | 1,3,5-triisopropylbenzene | 0.35 | α,α'-diethoxy-o-xylene | 0.2 | stannic chloride | | 0.2 | 140–160/5 | 95 | 2450 | 14.9 |
| 29 | 0.1 | 1,2,3-trimethylbenzene | 0.3 | α,α'-di-n-butoxy-m-xylene | 0.2 | stannic chloride | | 0.5 | 150–160/6 | 90 | 2550 | 17.2 |

* wt. % based on the whole reaction mixture
** Measured by a ring and ball softening point measuring apparatus in accordance with JIS-K-2548.

RESIN SYNTHESIS EXAMPLE 30

Charged in a reactor were 13.8 g (0.1 mole) of salicylic acid, 24 g (0.2 mole) of mesitylene and 20.6 g (0.1 mole) of p-tert-octylphenol and 33.2 g (0.2 mole) of α,α'-dimethoxy-p-xylene, followed by an addition of 0.3 g of p-toluenesulfonic acid as a catalysts. Thereafter, the contents were heated with stirring and reacted at 150°–160° C. for 4 hours. In the course of the reaction, 11.2 g of methanol was distilled out in total. After completion of the reaction, 200 ml of toluene was added to dissolve the reaction mixture. The solution was then added with 400 ml of warm water. After stirring the resultant mixture for 30 minutes under reflux, the lower layer, i.e, the water layer was removed. The extraction and separation of unreacted monomers with 400 ml of warm water was repeated two more times, followed by distillation of the solvent, i.e., toluene under reduced pressure. The molten resin was thereafter taken out and a light brown, transparent resin was obtained. The weight average molecular weight of the thus-obtained resin was 2,550. Its softening point was measured by the ring and ball softening point measuring apparatus in accordance with JIS K-2548. It was found to be 72° C. A tetrahydrofuran solution of the resin was titrated with a 1/10 N aqueous solution of sodium carbonate to determine the content of the salicylic acid moiety in the resin. It was found to be 12.8 wt. %.

RESIN SYNTHESIS EXAMPLES 31–36

The various salicylic acid-mesitylene-p-substituted phenol co-condensation resins shown in Table 3 were obtained in the same manner as in Resin Synthesis Example 30 except that the amount of mesitylene and those of the p-substituted phenol, α,α'-dialkoxyxylene and catalyst were modified relative to salicylic acid as shown in Table 3 and their kinds and the reaction conditions were also changed as shown in the same table.

TABLE 3

Salicylic Acid-Mesitylene-p-Substituted Phenol Co-Condensation Resins

| Resin synthesis ex. | Composition of reaction mixture | | | | | Reaction conditions Temp./time (°C./hr) | Resin | | Proportion of salicylic acid in reaction mixture (wt. %) |
|---|---|---|---|---|---|---|---|---|---|
| | Amount of salicylic acid (mole) | Amount of mesitylene (mole) | p-Substituted phenol Kind (Amount, mole) | α,α'-Dialkoxy-p-xylene Kind (Amount, mole) | Catalyst Kind (Amount,*) | | Softening point** (°C.) | Weight average molecular weight Mw | |
| 31 | 0.1 | 0.1 | p-tert-octylphenol (0.2) | α,α'-dimethoxy-p-xylene (0.2) | p-toluenesulfonic acid (0.3) | 140–160/3 | 74 | 2700 | 12.4 |
| 32 | 0.1 | 0.4 | p-cyclohexylphenol (0.1) | α,α'-dimethoxy-p-xylene (0.27) | p-toluenesulfonic acid (0.3) | 140–160/3 | 78 | 2300 | 14.5 |
| 33 | 0.1 | 0.7 | p-nonylphenol (0.2) | α,α'-dimethoxy-p-xylene | p-toluenesulfonic acid | 140–160/3 | 98 | 3200 | 17.1 |

TABLE 3-continued

Salicylic Acid-Mesitylene-p-Substituted Phenol Co-Condensation Resins

| Resin synthesis ex. | Amount of salicyclic acid (mole) | Amount of mesitylene (mole) | p-Substituted phenol Kind (Amount, mole) | $\alpha,\alpha'$-Dialkoxy-p-xylene Kind (Amount, mole) | Catalyst Kind (Amount,*) | Reaction conditions Temp./time (°C./hr) | Softening point** (°C.) | Weight average molecular weight $\overline{M}w$ | Proportion of salicylic acid in reaction mixture (wt. %) |
|---|---|---|---|---|---|---|---|---|---|
| 34 | 0.1 | 0.05 | p-$\alpha,\alpha$-dimethyl-benzylphenol (0.25) | $\alpha,\alpha'$-dimethoxy-p-xylene (0.16) | (0.65) methane-sulfonic acid (0.3) (0.05) | 150–165/6 | 59 | 1950 | 16.2 |
| 35 | 0.1 | 0.1 | p-sec-butyl-phenol (0.6) | $\alpha,\alpha'$-diethoxy-p-xylene (0.4) | stannic chloride (1.0) | 160–170/5 | 66 | 2700 | 10.9 |
| 36 | 0.1 | 0.2 | p-phenylphenol (0.3) | $\alpha,\alpha'$-di-n-butoxy-p-xylene (0.33) | p-toluene-acid + zinc chloride (0.4 + 0.6) | 170–180/7 | 72 | 2480 | 12.8 |

*wt. % based on the whole reaction mixture
**Measured by a ring and ball softening point measuring apparatus in accordance with JIS-K-2548.

RESIN SYNTHESIS EXAMPLE 37

Charged in a reactor were 13.8 g (0.1 mole) of salicylic acid, 61.8 g (0.3 mole) of p-tert-octylphenol and 33.2 g (0.2 mole) of $\alpha,\alpha'$-dimethoxy-p-xylene, followed by an addition of 0.5 g of p-toluenesulfonic acid as a catalysts. Thereafter, the contents were heated and after dissolution of the solid matter, were stirred. They were reacted at 150°–160° C. for 4 hours. In the course of the reaction, 12.2 g of methanol was distilled out in total. After completion of the reaction, 200 ml of toluene was added to dissolve the reaction mixture. The solution was then added with 400 ml of warm water. After stirring the resultant mixture for 30 minutes under reflux, the lower layer, i.e, the water layer was removed. The extraction and separation of unreacted monomers with 400 ml of warm water was repeated two more times, followed by distillation of the solvent, i.e., toluene under reduced pressure. The molten resin was thereafter taken out and a light brown, transparent resin was obtained. The weight average molecular weight of the thus-obtained resin was 1,850. Its softening point was measured by the ring and ball softening point measuring apparatus in accordance with JIS K-2548. It was found to be 54° C. A tetrahydrofuran solution of the resin was titrated with a 1/10 N aqueous solution of sodium carbonate to determine the content of the salicylic acid moiety in the resin. It was found to be 10.8 wt. %.

RESIN SYNTHESIS EXAMPLES 38–42

The various salicylic acid-p-substituted phenol co-condensation resins shown in Table 4 were obtained in the same manner as in Resin Synthesis Example 37 except that the amount of the p-substituted phenol, $\alpha,\alpha'$-dialkoxy-p-xylene and catalyst were modified relative to salicylic acid as shown in Table 4 and their kinds and the reaction conditions were also changed as shown in Table 4.

TABLE 4

Salicylic Acid-p-Substituted Phenol Co-Condensation Resins

| Resin synthesis ex. | Amount of salicyclic acid (mole) | p-Substituted phenol Kind | p-Substituted phenol Amount (mole) | $\alpha,\alpha'$-Dialkoxy-xylene Kind | $\alpha,\alpha'$-Dialkoxy-xylene Amount (mole) | Catalyst Kind | Catalyst Amount* | Reaction conditions Temp./time (°C./hr) | Softening point** (°C.) | Weight average molecular weight, $\overline{M}w$ | Proportion of salicyclic acid in reaction mixture (wt. %) |
|---|---|---|---|---|---|---|---|---|---|---|---|
| 38 | 0.1 | p-cyclohexyl phenol | 0.1 | $\alpha,\alpha'$-dimethoxy-p-xylene | 0.09 | stannous chloride | 0.2 | 140–155/3 | 87 | 1700 | 26.7 |
| 39 | 0.1 | p-sec-butyl phenol | 0.9 | $\alpha,\alpha'$-dimethoxy-p-xylene | 0.6 | p-toluene-sulfonic acid | 0.1 | 150–155/3 | 63 | 2550 | 7.5 |
| 40 | 0.1 | p-$\alpha,\alpha$-dimethyl-benzylphenol | 0.5 | $\alpha,\alpha'$-dimethoxy-p-xylene | 0.3 | methane-sulfonic acid | 0.1 | 150–155/3 | 75 | 1900 | 9.2 |
| 41 | 0.1 | p-nonyl-phenol | 1.3 | $\alpha,\alpha'$-diethoxy-p-xylene | 0.98 | zinc chloride | 1.0 | 160–170/5 | 96 | 3500 | 8.0 |
| 42 | 0.1 | p-phenyl-phenol | 0.3 | $\alpha,\alpha'$-di-n-butoxy-p-xylene | 0.2 | zinc chloride + p-toluene sulfonic acid | 0.2 0.1 | 170–180/5 | 93 | 1850 | 12.5 |

*wt. % based on the whole reaction mixture
**Measured by a ring and ball softening point measuring apparatus in accordance with JIS-K-2548.

METAL-MODIFIED RESIN SYNTHESIS EXAMPLE 1

Charged in a flask was 12.5 g of the salicylic acid resin obtained in Resin Synthesis Example 2. The resin was heated and molten at 150°–160° C. A mixture of 8.2 g of zinc benzoate and 5 g of ammonium bicarbonate, which had been combined together in advance, was then added gradually with stirring to the molten resin over 30 minutes. The resultant mixture was thereafter stirred at 155°–165° C. for 1 hour to complete the reaction. After completion of the reaction, the molten resin was taken out of the flask, cooled and then ground, thereby obtaining 18.5 g of a zinc-modified resin in the form of powder. The softening point of the zinc-modified resin was measured by the ring and ball softening point measuring apparatus in accordance with JIS K-2548. It was found to be 125° C.

METAL-MODIFIED RESIN SYNTHESIS EXAMPLE 2–40

The various metal-modified resins shown in Table 5-1 to Table 5-6 were produced in the same manner as in Metal-Modified Resin Synthesis Example 1 except that the salicylic acid resins obtained in Resin Synthesis Examples 3 and 5–42 were used and the kinds of the modifier and additive were changed as shown in Table 5-1 to Table 5-6.

TABLE 5-1

Metal-Modified Salicylic Acid-Mesitylene Co-Condensation Resins

| Metal-modified resin synthesis example | Salicylic acid-mesitylene co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 2 | 3 | 10 | zinc acetate | 4.4 | — | — | 139 |
| 3 | 5 | 10 | zinc acetate | 1.3 | ammonium acetate | 2.4 | 118 |
| 4 | 6 | 10 | zinc benzoate | 3.2 | ammonium bicarbonate | 2.0 | 104 |
| 5 | 7 | 10 | zinc hydroxide | 0.96 | ammonium stearate | 3.6 | 126 |
| 6 | 8 | 10 | nickel acetate | 0.85 | — | — | 116 |
| 7 | 9 | 10 | zinc propionate | 0.49 | ammonium carbonate | 0.38 | 141 |
| 8 | 10 | 10 | zinc carbonate | 0.61 | ammonium benzoate | 2.4 | 116 |
| 9 | 11 | 10 | zinc stearate | 3.1 | ammonium bicarbonate | 1.2 | 95 |

*Measured by a ring and ball softening point measuring apparatus in accordance with JIS-K-2548.

TABLE 5-2

Metal-Modified Salicylic Acid-Trialkylbenzene Co-Condensation Resins

| Metal-modified resin synthesis example | Salicylic acid-trialkylbenzene co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 10 | 12 | 10 | zinc benzoate | 3.0 | ammonium bicarbonate | 2.0 | 101 |
| 11 | 13 | 10 | magnesium hydroxide | 0.5 | ammonium stearate | 1.5 | 96 |
| 12 | 14 | 10 | nickel acetate | 0.7 | — | — | 92 |
| 13 | 15 | 10 | zinc propionate | 0.4 | ammonium bicarbonate | 0.8 | 110 |
| 14 | 16 | 10 | zinc oxide | 0.25 | ammonium benzoate | 1.2 | 99 |
| 15 | 17 | 10 | zinc stearate | 2.8 | — | — | 73 |

*Measured by a ring and ball softening point measuring apparatus in accordance with JIS-K-2548.

TABLE 5-3

Metal-Modified Salicylic Acid-Trialkylbenzene Co-Condensation Resins

| Metal-modified resin synthesis example | Salicylic acid-trialkylbenzene co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 16 | 18 | 10 | zinc benzoate | 3.2 | ammonium bicarbonate | 2.0 | 98 |
| 17 | 19 | 10 | magnesium hydroxide | 0.7 | ammonium stearate | 2.8 | 94 |
| 18 | 20 | 10 | nickel acetate | 0.8 | — | — | 81 |
| 19 | 21 | 10 | zinc propionate | 0.4 | ammonium bicarbonate | 0.8 | 92 |
| 20 | 22 | 10 | zinc oxide | 0.3 | ammonium benzoate | 1.2 | 96 |
| 21 | 23 | 10 | zinc stearate | 3.1 | — | — | 86 |

*Measured by a ring and ball softening point measuring apparatus in accordance with JIS-K-2548.

TABLE 5-4

Metal-Modified Salicylic Acid-Trialkylbenzene Co-Condensation Resins

| Metal-modified resin synthesis example | Salicylic acid-trialkylbenzene co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 22 | 24 | 10 | zinc benzoate | 3.2 | ammonium bicarbonate | 2.0 | 106 |
| 23 | 25 | 10 | magnesium hydroxide | 0.7 | ammonium stearate | 2.8 | 84 |
| 24 | 26 | 10 | nickel acetate | 0.8 | — | — | 91 |
| 25 | 27 | 10 | zinc propionate | 0.4 | ammonium bicarbonate | 0.8 | 96 |
| 26 | 28 | 10 | zinc oxide | 0.3 | ammonium benzoate | 1.2 | 102 |
| 27 | 29 | 10 | zinc stearate | 3.1 | — | — | 91 |

*Measured by a ring and ball softening point measuring apparatus in accordance with JIS-K-2548.

TABLE 5-5

Metal-Modified Salicylic Acid-Mesitylene-p-Substituted Phenol Co-Condensation Resins

| Metal modified resin synthesis example | Salicylic acid-mesitylene-p-substituted phenol co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 28 | 30 | 10 | zinc benzoate | 1.4 | ammonium bicarbonate | 0.85 | 94 |
| 29 | 31 | 10 | zinc hydroxide | 0.9 | ammonium stearate | 3.4 | 87 |
| 30 | 32 | 10 | nickel acetate | 1.6 | — | — | 113 |
| 31 | 33 | 10 | zinc propionate | 0.9 | ammonium carbonate | 0.58 | 136 |
| 32 | 34 | 10 | zinc carbonate | 1.3 | ammonium benzoate | 3.5 | 84 |
| 33 | 35 | 10 | zinc stearate | 4.5 | ammonium bicarbonate | 1.4 | 81 |
| 34 | 36 | 10 | zinc oxide | 1.2 | ammonium benzoate | 3.8 | 99 |

*Measured by a ring and ball softening point measuring apparatus in accordance with JIS-K-2548.

TABLE 5-6

Metal-Modified Salicylic Acid-p-Substituted Phenol Co-Condensation Resins

| Metal-modified resin synthesis example | Salicylic acid-p-substituted phenol co-condensation resin Synthesis Ex. No. | Amount (g) | Modifier Kind | Amount (g) | Additive Kind | Amount (g) | Softening point* of metal-modified resin (°C.) |
|---|---|---|---|---|---|---|---|
| 35 | 37 | 10 | zinc benzoate | 4.9 | ammonium bicarbonate | 3.0 | 106 |
| 36 | 38 | 10 | zinc acetate | 1.1 | ammonium stearate | 4.2 | 102 |
| 37 | 39 | 10 | nickel acetate | 0.65 | — | — | 91 |
| 38 | 40 | 10 | zinc propionate | 1.7 | ammonium carbonate | 1.5 | 116 |
| 39 | 41 | 10 | zinc carbonate | 0.95 | ammonium benzoate | 3.0 | 108 |
| 40 | 42 | 10 | zinc stearate | 3.8 | ammonium bicarbonate | 1.2 | 110 |

*Measured by a ring and ball softening point measuring apparatus in accordance with JIS-K-2548.

METAL-MODIFIED RESIN SYNTHESIS EXAMPLE 41

Ten grams of the resin obtained in Resin Synthesis Example 1 were ground and then dispersed in 100 g of an aqueous solution containing 2 g of caustic soda. When the dispersion was heated to 70° C. with stirring, the resin was dissolved. While maintaining the temperature of the solution at 45°-50° C., a solution which had been prepared in advance by dissolving 3.8 g of anhydrous zinc chloride (purity: 90%) in 30 ml of water was added dropwise over 30 minutes.

A white precipitate occurred. After stirring the reaction mixture at the same temperature for 2 hours, it was filtered. The precipitate was washed with water and then dried to obtain 11.5 g of white powder. It was the zinc salt of the salicylic acid resin. The zinc content was 15.2%.

METAL-MODIFIED RESIN SYNTHESIS EXAMPLES 42-50

The various metal-modified resins shown in Table 6 were produced in the same manner as in Metal-Modified Resin Synthesis Example 41 by using the salicylic acid resins obtained in Resin Synthesis Examples 1, 12, 18, 24, 30, 37 and 38 respectively.

TABLE 6

Metal-Modified Salicylic Acid Resins

| Metal-Modified Resin Synthesis Example | Salicylic acid resin Synthesis Ex. No. | Amount (g) | Aqueous alkali solution Kind | Amount (g) | Modifier Kind | Amount (g) | Yield of metal-modified resin (g) | Metal content (%) |
|---|---|---|---|---|---|---|---|---|
| 42 | 1 | 10 | caustic soda | 2.0 | nickel chloride hexahydrate (purity 96%) | 6.2 | 11.5 | — |
| 43 | 1 | 10 | caustic soda | 2.0 | magnesium chloride | 2.5 | 10.5 | — |
| 44 | 6 | 10 | caustic soda | 0.8 | anhydrous zinc chloride | 1.5 | 10.4 | 5.1 |
| 45 | 12 | 10 | caustic soda | 0.5 | anhydrous zinc chloride | 1.0 | 10.4 | 3.9 |
| 46 | 18 | 10 | caustic soda | 0.5 | anhydrous zinc chloride | 1.0 | 10.4 | 3.7 |
| 47 | 24 | 10 | caustic soda | 0.5 | anhydrous zinc chloride | 1.0 | 10.4 | 3.5 |
| 48 | 30 | 10 | caustic soda | 0.4 | anhydrous zinc chloride | 0.8 | 10.4 | 2.98 |
| 49 | 37 | 10 | caustic soda | 0.2 | anhydrous zinc chloride | 2.3 | 10.8 | 8.72 |
| 50 | 38 | 10 | anhydrous sodium carbonate | 1.33 | magnesium chloride | 1.43 | 10.2 | 3.4 |

EXAMPLES 1-50

In a sand grinding mill, suspensions were separately prepared by using the metal-modified resins of the salicylic acid co-condensation resins, which had been obtained in Metal-Modified Resin Synthesis Examples 1-50 respectively, as color-developing agents and dispersing them to give the following composition.

|  | Parts by weight |
|---|---|
| Color-developing agent | 6 |
| 10% Aq. PVA solution (PVA: "Kuraray #117", product of Kuraray Co., Ltd.) | 3 |
| Water | 22.5 |

Then, coating formulations of the following composition were prepared by using the above suspensions separately.

|  | Parts by weight |
|---|---|
| Suspension | 10 |
| Light calcium carbonate | 10 |
| Starch | 0.8 |
| Synthetic rubber latex | 0.8 |
| Water | 32.5 |

Those coating formulations were separately applied on high-quality paper webs to achieve a dry coat weight of 5.0–5.5 g/m², thereby obtaining color-developing sheets.

EXAMPLES 51-64

Coating formulations of the following composition were separately prepared by using suspensions of the color-developing agents obtained in Metal-Modified Resin Synthesis Examples 1, 4, 10, 16, 22, 28, 35, 41, 44-48, and 49.

|  | Parts by weight |
|---|---|
| Suspension | 10 |
| Zinc oxide | 2 |
| Calcium carbonate | 8 |
| Starch | 0.8 |
| Synthetic rubber latex | 0.8 |
| Water | 32.5 |

Those coating formulations were separately applied on high-quality paper webs to achieve a dry coat weight of 5.0–5.5 g/m², thereby obtaining color-developing sheets.

COMPARATIVE EXAMPLE 1

Charged in a glass-made reactor were 170 g of p-phenylphenol, 22.5 g of 80% para-formaldehyde, 2.0 g of p-toluenesulfonic acid and 200 g of benzene. The contents were heated with stirring and while distilling out the resulting water as an azeotropic mixture with benzene from the reaction system, they were reacted at 70°–80° C. for 2 hours. After the reaction, 320 g of a 10% aqueous solution of sodium hydroxide was added and benzene was distilled out by steam distillation. The reaction mixture was then cooled, followed by dropwise addition of dilute sulfuric acid. The precipitated p-phenylphenol-formaldehyde polymer was collected by filtration, washed with water and then dried, thereby obtaining 176 g of white powder. Using the p-phenylphenol-formaldehyde polymer, color-developing sheets were obtained in the same manner as in Examples 1-64.

The evaluation results of performance of the color-developing sheets obtained in Examples 1-64 and Comparative Example 1 are shown in Table 7-1 to Table 7-7.

TABLE 7

Performance Test Results of Color Developing Sheets

| Ex. | Metal-modified resin Synthesis Ex. | Whiteness of color-developing sheet (WB value) Before test | NO$_x$ yellowing property | Light yellowing property | Produced color density (Y) 1.5 min. later | 24 hrs. later | Light fastness of produced color marks (Y) 2 hrs. | 4 hrs. | Plasticizer resistance of produced color marks (Y) | Waterproofness of produced color marks | Produced color density (Y) 1.5 min. later | 24 hrs. later |
|---|---|---|---|---|---|---|---|---|---|---|---|---|
| 1 | 1 | 84.5 | 79.3 (5.2)* | 77.4 (7.1)* | 64.2 | 61.5 | 70.2 | 78.0 | 60.5 | good | 59.6 | 55.2 |
| 2 | 2 | 84.5 | 80.0 (4.5) | 77.0 (7.5) | 65.9 | 63.0 | 70.9 | 78.1 | 60.4 | good | 60.1 | 57.8 |
| 3 | 3 | 83.5 | 79.1 (4.6) | 77.7 (5.8) | 67.1 | 65.8 | 71.6 | 77.5 | 63.2 | good | 63.3 | 56.9 |
| 4 | 41 | 83.6 | 79.6 (4.0) | 77.1 (6.5) | 66.5 | 63.3 | 69.8 | 77.5 | 65.4 | good | 63.1 | 57.1 |
| 5 | 42 | 84.2 | 80.9 (3.3) | 80.3 (3.9) | 70.5 | 61.1 | 64.2 | 67.9 | 60.8 | good | 64.5 | 57.1 |
| 6 | 43 | 84.0 | 77.4 (6.6) | 75.5 (8.5) | 63.3 | 63.0 | 73.6 | 80.1 | 68.2 | good | 65.9 | 60.4 |
| 51 | 1 | 84.3 | 77.5 (6.8) | 78.5 (5.4) | 63.3 | 61.5 | 66.9 | 73.5 | 61.0 | good | 59.0 | 57.5 |
| 52 | 41 | 84.8 | 77.1 (7.7) | 78.2 (6.6) | 65.6 | 63.4 | 68.0 | 74.1 | 60.9 | good | 60.2 | 58.1 |
| 7 | 4 | 84.2 | 83.4 (0.5)* | 78.1 (6.1)* | 62.1 | 58.3 | 67.5 | 76.0 | 59.6 | good | 61.5 | 57.2 |
| 8 | 5 | 84.3 | 82.3 (1.5) | 77.8 (7.0) | 66.9 | 60.7 | 67.1 | 74.2 | 60.2 | good | 64.9 | 58.8 |
| 9 | 6 | 84.8 | 84.1 (0.7) | 79.9 (4.9) | 62.6 | 59.4 | 64.8 | 70.0 | 60.2 | good | 61.1 | 59.0 |
| 10 | 7 | 84.9 | 83.6 (1.3) | 77.6 (7.3) | 70.5 | 65.8 | 72.6 | 80.3 | 67.7 | good | 65.5 | 63.2 |
| 11 | 8 | 84.2 | 83.3 (0.9) | 77.6 (6.6) | 63.0 | 59.9 | 67.4 | 77.2 | 59.4 | good | 61.9 | 59.0 |
| 12 | 9 | 85.0 | 83.7 (1.3) | 78.1 (7.1) | 63.2 | 60.2 | 68.1 | 77.5 | 59.8 | good | 60.8 | 57.9 |
| 13 | 44 | 84.8 | 83.6 (1.2) | 77.5 (7.3) | 65.7 | 60.2 | 67.7 | 76.9 | 59.7 | good | 64.7 | 62.2 |
| 53 | 4 | 83.6 | 82.2 (1.4) | 78.2 (5.4) | 61.4 | 57.7 | 66.0 | 74.1 | 56.7 | good | 59.5 | 56.0 |
| 54 | 44 | 83.8 | 82.0 (1.8) | 77.7 (6.1) | 65.7 | 60.5 | 67.2 | 75.2 | 60.1 | good | 64.1 | 58.1 |
| 14 | 10 | 84.1 | 82.5 (1.6)* | 79.8 (4.3)* | 61.0 | 58.2 | 68.8 | 73.2 | 57.0 | good | 61.3 | 56.4 |
| 15 | 11 | 84.2 | 83.7 (0.5) | 77.0 (7.2) | 64.2 | 60.9 | 70.2 | 77.0 | 58.2 | good | 66.8 | 60.3 |
| 16 | 12 | 84.5 | 84.0 (0.5) | 81.2 (3.3) | 63.0 | 60.0 | 64.8 | 68.4 | 59.5 | good | 60.3 | 55.4 |
| 17 | 13 | 84.3 | 83.7 (0.6) | 78.8 (5.5) | 64.8 | 61.1 | 69.2 | 75.1 | 60.0 | good | 63.7 | 58.5 |
| 18 | 14 | 84.3 | 83.5 (0.8) | 78.8 (5.5) | 61.2 | 57.9 | 67.7 | 73.9 | 58.1 | good | 60.8 | 57.2 |
| 19 | 15 | 84.2 | 83.9 (0.3) | 79.0 (5.2) | 60.8 | 57.1 | 68.2 | 74.0 | 57.5 | good | 60.2 | 56.5 |
| 20 | 45 | 84.2 | 83.6 (0.6) | 78.2 (6.0) | 63.5 | 59.5 | 69.0 | 73.8 | 59.0 | good | 61.5 | 57.5 |
| 55 | 10 | 84.3 | 83.9 (0.4) | 77.9 (6.4) | 61.9 | 57.5 | 67.2 | 72.0 | 55.4 | good | 61.5 | 56.0 |
| 56 | 45 | 84.2 | 83.9 (0.3) | 80.0 (4.2) | 64.2 | 61.0 | 67.5 | 72.1 | 58.4 | good | 62.0 | 58.1 |

*Each figure in parentheses indicates the difference between the WB value of the tested color-developing sheet and that of the same color-developing sheet before the test.

TABLE 7-4

Performance Test Results of Color Developing Sheets

| Ex. | Metal-modified resin Synthesis Ex. | Whiteness of color-developing sheet (WB value) Before test | NO$_x$ yellowing property | Light yellowing property | Produced color density (Y) 1.5 min. later | 24 hrs. later | Light fastness of produced color marks (Y) 2 hrs. | 4 hrs. | Plasticizer resistance of produced color marks (Y) | Waterproofness of produced color marks | Produced color density (Y) 1.5 min. later | 24 hrs. later |
|---|---|---|---|---|---|---|---|---|---|---|---|---|
| 21 | 16 | 85.2 | 83.1 (2.1)* | 81.9 (3.3)* | 62.1 | 57.6 | 68.0 | 73.5 | 57.4 | good | 60.8 | 55.4 |
| 22 | 17 | 85.0 | 81.4 (3.6) | 78.1 (6.9) | 64.2 | 60.1 | 72.2 | 78.8 | 62.1 | good | 62.2 | 56.9 |
| 23 | 18 | 85.3 | 83.9 (1.4) | 82.7 (2.6) | 62.5 | 57.0 | 66.9 | 69.5 | 59.0 | good | 59.8 | 55.2 |
| 24 | 19 | 85.1 | 82.6 | 81.5 | 61.9 | 57.8 | 69.2 | 74.1 | 60.1 | good | 61.1 | 55.6 |

TABLE 7-4-continued
Performance Test Results of Color Developing Sheets

| Ex. | Metal-modified resin Synthesis Ex. | Whiteness of color-developing sheet (WB value) | | Production of blue color | | | | | Waterproofness of produced color marks | Production of black color | |
|---|---|---|---|---|---|---|---|---|---|---|---|
| | | Before test | NO$_x$ yellowing property | Light yellowing property | Produced color density (Y) | | Light fastness of produced color marks (Y) | | Plasticizer resistance of produced color marks (Y) | | Produced color density (Y) | |
| | | | | | 1.5 min. later | 24 hrs. later | 2 hrs. | 4 hrs. | | | 1.5 min. later | 24 hrs. later |
| 25 | 20 | 85.2 | 82.9 (2.5) | 81.6 (3.6) | 61.3 | 57.3 | 69.2 | 74.0 | 60.3 | good | 61.8 | 56.6 |
| 26 | 21 | 85.5 | 83.3 (2.3) | 82.0 (3.6) | 63.9 | 59.9 | 70.2 | 75.3 | 57.8 | good | 60.5 | 56.6 |
| 27 | 46 | 85.2 | 82.2 (2.2) | 81.6 (3.5) | 61.6 | 56.4 | 67.2 | 72.0 | 57.8 | good | 61.1 | 57.5 |
| 57 | 16 | 85.0 | 82.6 (3.0) | 81.4 (3.6) | 62.4 | 57.2 | 67.0 | 71.9 | 56.4 | good | 61.5 | 55.6 |
| 58 | 46 | 85.0 | 82.0 (2.4) | 81.0 (3.6) (4.0) | 61.5 | 56.5 | 66.5 | 70.2 | 57.5 | good | 61.3 | 55.4 |

*Each figure in parentheses indicates the difference between the WB value of the tested color-developing sheet and that of the same color-developing sheet before the test.

TABLE 7-5
Performance Test Results of Color Developing Sheets

| Ex. | Metal-modified resin Synthesis Ex. | Whiteness of color-developing sheet (WB value) | | Production of blue color | | | | | Waterproofness of produced color marks | Production of black color | |
|---|---|---|---|---|---|---|---|---|---|---|---|
| | | Before test | NO$_x$ yellowing property | Light yellowing property | Produced color density (Y) | | Light fastness of produced color marks (Y) | | Plasticizer resistance of produced color marks (Y) | | Produced color density (Y) | |
| | | | | | 1.5 min. later | 24 hrs. later | 2 hrs. | 4 hrs. | | | 1.5 min. later | 24 hrs. later |
| 28 | 22 | 85.2 | 83.4 (1.8)* | 82.6 (2.6)* | 61.9 | 57.0 | 69.0 | 73.0 | 56.5 | good | 61.0 | 55.2 |
| 29 | 23 | 84.6 | 81.0 (3.6) | 79.8 (4.8) | 64.9 | 61.4 | 73.4 | 79.0 | 61.4 | good | 62.1 | 58.2 |
| 30 | 24 | 83.9 | 83.4 (0.5) | 82.8 (5.9) | 61.4 | 57.8 | 66.5 | 70.0 | 58.0 | good | 59.5 | 55.1 |
| 31 | 25 | 84.4 | 83.0 (1.4) | 82.6 (1.8) | 61.0 | 57.0 | 68.8 | 74.4 | 56.5 | good | 60.1 | 55.4 |
| 32 | 26 | 84.7 | 83.7 (1.0) | 82.4 (2.3) | 61.6 | 57.2 | 69.4 | 74.9 | 56.2 | good | 60.8 | 56.0 |
| 33 | 27 | 84.0 | 83.8 (0.2) | 82.0 (2.0) | 64.4 | 60.0 | 70.9 | 75.5 | 59.8 | good | 62.5 | 57.2 |
| 34 | 47 | 84.6 | 82.9 (1.7) | 82.0 (2.6) | 61.2 | 56.2 | 68.0 | 72.6 | 56.8 | good | 60.1 | 55.9 |
| 59 | 22 | 84.6 | 82.9 (1.7) | 81.8 (2.8) | 62.0 | 57.3 | 67.5 | 71.6 | 57.4 | good | 60.5 | 56.9 |
| 60 | 47 | 84.0 | 82.6 (1.4) | 81.1 (2.9) | 61.8 | 56.5 | 66.0 | 70.2 | 56.5 | good | 61.1 | 55.2 |

*Each figure in parentheses indicates the difference between the WB value of the tested color-developing sheet and that of the same color-developing sheet before the test.

TABLE 7-6
Performance Test Results of Color Developing Sheets

| Ex. | Metal-modified resin Synthesis Ex. | Whiteness of color-developing sheet (WB value) | | Production of blue color | | | | | Waterproofness of produced color marks | Production of black color | |
|---|---|---|---|---|---|---|---|---|---|---|---|
| | | Before test | NO$_x$ yellowing property | Light yellowing property | Produced color density (Y) | | Light fastness of produced color marks (Y) | | Plasticizer resistance of produced color marks (Y) | | Produced color density (Y) | |
| | | | | | 1.5 min. later | 24 hrs. later | 2 hrs. | 4 hrs. | | | 1.5 min. later | 24 hrs. later |
| 35 | 28 | 84.5 | 82.1 (2.4)* | 79.8 (4.7)* | 61.4 | 58.0 | 67.4 | 76.4 | 59.1 | good | 58.2 | 54.9 |
| 36 | 29 | 84.5 | 82.3 (2.2) | 78.7 (5.7) | 60.8 | 57.6 | 68.5 | 77.3 | 59.3 | good | 57.1 | 54.3 |
| 37 | 30 | 84.2 | 82.9 (1.3) | 79.2 (5.0) | 61.9 | 58.0 | 65.7 | 69.9 | 60.0 | good | 60.5 | 57.2 |
| 38 | 31 | 84.0 | 79.2 (4.8) | 76.1 (7.9) | 65.5 | 62.9 | 67.8 | 78.8 | 61.1 | good | 63.8 | 61.1 |
| 39 | 32 | 84.1 | 83.3 (0.8) | 78.3 (5.8) | 63.2 | 58.4 | 66.9 | 75.3 | 58.3 | good | 59.9 | 57.4 |
| 40 | 33 | 84.5 | 82.6 (1.9) | 77.2 (7.3) | 64.4 | 59.9 | 68.9 | 79.2 | 61.7 | good | 60.0 | 57.5 |
| 41 | 34 | 83.9 | 78.2 (5.7) | 77.8 (6.1) | 59.8 | 57.1 | 69.0 | 77.7 | 62.7 | good | 57.9 | 54.8 |
| 42 | 48 | 84.2 | 82.0 (2.2) | 78.7 (5.4) | 62.2 | 59.8 | 70.6 | 78.2 | 59.5 | good | 61.1 | 57.5 |
| 61 | 28 | 84.7 | 81.1 | 78.2 | 61.1 | 58.1 | 65.9 | 74.2 | 62.4 | good | 60.1 | 55.8 |

TABLE 7-6-continued

Performance Test Results of Color Developing Sheets

| Ex. | Metal-modified resin Synthesis Ex. | Whiteness of color-developing sheet (WB value) | | | Production of blue color | | | | | Production of black color | |
|---|---|---|---|---|---|---|---|---|---|---|---|
| | | Before test | NO$_x$ yellowing property | Light yellowing property | Produced color density (Y) | | Light fastness of produced color marks (Y) | | Plasticizer resistance of produced color marks (Y) | Waterproofness of produced color marks | Produced color density (Y) | |
| | | | | | 1.5 min. later | 24 hrs. later | 2 hrs. | 4 hrs. | | | 1.5 min. later | 24 hrs. later |
| 62 | 48 | 84.8 | (3.6) 81.5 (3.3) | (6.5) 79.4 (5.4) | 62.0 | 59.6 | 68.0 | 76.6 | 63.5 | good | 59.8 | 57.0 |

*Each figure in parentheses indicates the difference between the WB value of the tested color-developing sheet and that of the same color-developing sheet before the test.

TABLE 7-7

Performance Test Results of Color Developing Sheets

| Ex. | Metal-modified resin Synthesis Ex. | Whiteness of color-developing sheet (WB value) | | | Production of blue color | | | | | Production of black color | |
|---|---|---|---|---|---|---|---|---|---|---|---|
| | | Before test | NO$_x$ yellowing property | Light yellowing property | Produced color density (Y) | | Light fastness of produced color marks (Y) | | Plasticizer resistance of produced color marks (Y) | Waterproofness of produced color marks | Produced color density (Y) | |
| | | | | | 1.5 min. later | 24 hrs. later | 2 hrs. | 4 hrs. | | | 1.5 min. later | 24 hrs. later |
| 43 | 35 | 85.5 | 83.6 (1.9)* | 77.7 (7.8)* | 64.4 | 59.7 | 69.5 | 77.1 | 57.0 | good | 63.1 | 57.3 |
| 44 | 36 | 85.7 | 84.2 (1.5) | 78.8 (6.9) | 70.3 | 65.4 | 69.0 | 74.5 | 61.1 | good | 65.5 | 60.0 |
| 45 | 37 | 85.0 | 81.4 (3.6) | 75.2 (9.8) | 66.2 | 61.9 | 65.4 | 68.6 | 64.4 | good | 63.1 | 58.9 |
| 46 | 38 | 85.1 | 83.8 (1.3) | 78.0 (7.1) | 68.1 | 59.4 | 67.7 | 73.3 | 65.9 | good | 62.0 | 57.5 |
| 47 | 39 | 84.3 | 77.9 (6.4) | 74.8 (9.5) | 68.2 | 61.6 | 70.5 | 78.3 | 60.5 | good | 62.1 | 56.9 |
| 48 | 40 | 84.1 | 75.2 (8.9) | 68.8 (15.3) | 64.2 | 58.2 | 67.6 | 75.3 | 60.5 | good | 60.3 | 58.1 |
| 49 | 49 | 85.2 | 82.4 (2.8) | 76.9 (8.3) | 62.1 | 59.3 | 69.0 | 77.6 | 56.0 | good | 59.4 | 57.0 |
| 50 | 50 | 84.1 | 78.0 (6.1) | 72.2 (11.9) | 65.4 | 64.4 | 72.1 | 78.9 | 60.1 | good | 60.9 | 58.1 |
| 63 | 35 | 84.6 | 82.9 (1.7) | 76.4 (8.2) | 65.1 | 60.2 | 65.8 | 71.1 | 58.2 | good | 63.8 | 57.9 |
| 64 | 49 | 84.0 | 81.0 (3.0) | 76.2 (7.8) | 61.1 | 59.3 | 67.7 | 73.8 | 57.9 | good | 56.0 | 53.2 |
| ** | (Comp. Ex. 1) | 84.6 | 59.7 (24.9) | 72.3 (12.3) | 64.8 | 61.0 | 75.2 | 80.5 | 77.2 | good | 61.4 | 57.5 |

*Each figure in parentheses indicates the difference between the WB value of the tested color-developing sheet and that of the same color-developing sheet before the test.
**Comparative example.

We claim:

1. A linear copolymer comprising 5 to 60 mole percent of individual structural units (I), 30 to 50 mole percent of individual structural units (II), 0 to 60 mole percent of individual structural units (III) and 0 to 60 mole percent of individual structural units (IV) and having a weight average molecular weight of 500 to 30,000, each individual structural unit (I), (III), or (IV) being coupled with an individual structural unit (I), (III), or (IV) via a structural unit (II), if said structural units (III) or said structural units (IV) is 0 mol percent, then the two terminal bonds of each individual structural unit II are not bonded to the same individual structural unit I, and said structural units (I), (II), (III) and (V) being represented respectively by the following formulae (I), (II), (III) and (IV):

(I)

(II)

(III)

(IV)

wherein $R_1$, $R_2$ and $R_3$ are an alkyl group having 4 or fewer carbon atoms and $R_4$ denotes an alkyl, Cycloalkyl, aralkyl or phenyl group; or a multivalent metal salt thereof in which the multivalent metal forms the multivalent metal salt between carboxyl groups within the safe molecule of the copolymer or between different molecules of the copolymer.

2. The copolymer or multivalent metal salt thereof as claimed in claim 1, wherein the proportions of the structural units (III) and (IV) are both 0 mole percent and the two —CH₂ groups are substituted to the para positions of the benzene ring in the structural unit (II).

3. The copolymer or multivalent metal salt thereof as claimed in claim 1, wherein the proportion of the structural unit (IV) is 0 mole percent.

4. The copolymer or multivalent metal salt thereof as claimed in claim 3, wherein the proportion of the structural unit (IV) is 0 mole percent and the two —CH₂— groups are substituted to the para positions of the benzene ring in the structural unit (II).

5. The copolymer or multivalent metal salt thereof as claimed in claim 1, wherein $R_1$, $R_2$ and $R_3$ are all methyl groups and are bonded at the 1, 3 and 5 positions, respectively, of the benzene in the structural unit (III) and the two —CH₂— groups are substituted to the para positions of the benzene ring of the structural formula (II).

6. The copolymer or multivalent metal salt thereof as claimed in claim 1, wherein the proportion of the structural unit (III) is 0 mole percent and the two —CH₂ groups are substituted to the para positions of the benzene ring in the structural unit (II).

7. A color-developing agent for pressure-sensitive copying paper, which contains as an effective component a multivalent metal-modified resin of the copolymer according to claim 1.

8. The color-developing agent as claimed in claim 7, wherein the multivalent metal is at least one metal selected from the group consisting of magnesium, aluminum, copper, zinc, tin, barium, cobalt and nickel.

9. The color-developing agent as claimed in claim 8, wherein the multivalent metal is zinc.

10. A color-developing agent for pressure-sensitive copying paper, which contains as an effective component a multivalent metal-modified resin of the copolymer according to claim 2.

11. A color-developing agent for pressure-sensitive copying paper, which contains as an effective component a multivalent metal-modified resin of the copolymer according to claim 3.

12. A color-developing agent for pressure-sensitive copying paper, which contains as an effective component a multivalent metal-modified resin of the copolymer according to claim 4.

13. A color-developing agent for pressure-sensitive copying paper, which contains as an effective component a multivalent metal-modified resin of the copolymer according to claim 5.

14. A color-developing agent for pressure-sensitive copying paper, which contains as an effective component a multivalent metal-modified resin of the copolymer according to claim 6.

15. The copolymer or multivalent metal salt thereof as claimed in claim 1 wherein $R_4$ is an alkyl group having 1 to 12 carbon atoms.

16. The copolymer or multivalent metal salt thereof as claimed in claim 1 wherein $R_4$ is cyclopentyl or cyclohexyl.

17. The copolymer or multivalent metal salt thereof as claimed in claim 1 wherein $R_4$ is benzyl, α-methylbenzyl or α,α-dimethylbenzyl.

18. The copolymer or multivalent metal salt thereof as claimed in claim 1 wherein the multivalent salt is magnesium, aluminum, copper, calcium, zinc, tin, barium, cobalt or nickel.

19. A color-developing agent for pressure-sensitive copying paper, which contains as an effective component a multivalent metal-modified resin of the copolymer according to claim 15.

20. A color-developing agent for pressure-sensitive copying paper, which contains as an effective component a multivalent metal-modified resin of the copolymer according to claim 16.

21. A color-developing agent for pressure-sensitive copying paper, which contains as an effective component a multivalent metal-modified resin of the copolymer according to claim 17.

22. A color-developing agent for pressure-sensitive copying paper, which contains as an effective component a multivalent metal-modified resin of the copolymer according to claim 18.

* * * * *